(12) United States Patent
Koh et al.

(10) Patent No.: US 8,329,344 B2
(45) Date of Patent: Dec. 11, 2012

(54) ELECTROLYTIC SOLUTION

(75) Inventors: Meiten Koh, Settsu (JP); Akiyoshi Yamauchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 1042 days.

(21) Appl. No.: 11/884,268

(22) PCT Filed: Feb. 14, 2006

(86) PCT No.: PCT/JP2006/302507
§ 371 (c)(1),
(2), (4) Date: Aug. 14, 2007

(87) PCT Pub. No.: WO2006/088009
PCT Pub. Date: Aug. 24, 2006

(65) Prior Publication Data
US 2008/0145763 A1    Jun. 19, 2008

(30) Foreign Application Priority Data

Feb. 16, 2005 (JP) ................................. 2005-039716
Mar. 30, 2005 (JP) ................................. 2005-099370
Jul. 6, 2005 (JP) ................................. 2005-198073

(51) Int. Cl.
*H01M 6/16* (2006.01)

(52) U.S. Cl. ........ 429/342; 429/163; 429/330; 429/324; 429/325; 252/62.2

(58) Field of Classification Search .................. 429/342, 429/160, 330, 324, 325; 252/62.1, 62.2
See application file for complete search history.

(56) References Cited

U.S. PATENT DOCUMENTS

| | | | |
|---|---|---|---|
| 2003/0162090 A1* | 8/2003 | Okada et al. | 429/137 |
| 2004/0038133 A1* | 2/2004 | Yamaguchi et al. | 429/326 |
| 2005/0227143 A1* | 10/2005 | Amine et al. | 429/188 |

FOREIGN PATENT DOCUMENTS

| | | | |
|---|---|---|---|
| JP | 10-144346 A | | 5/1998 |
| JP | 10-247519 A | | 9/1998 |
| JP | 11-307120 A | | 11/1999 |
| JP | 2003-217656 | * | 7/2003 |
| JP | 2003-217656 A | | 7/2003 |
| JP | 2004-14134 A | | 1/2004 |
| JP | 2005-047875 | * | 2/2005 |
| JP | 2005-47875 A | | 2/2005 |
| WO | WO 2011/006822 A1 | * | 1/2011 |

OTHER PUBLICATIONS

Kang Xu "Nonaqueous electrolytes for lithium based rechargeable batteries", Chem.Rev., 2004,104,4303-4417.*

* cited by examiner

*Primary Examiner* — Patrick Joseph Ryan
*Assistant Examiner* — Alex Usyatinsky
(74) *Attorney, Agent, or Firm* — Sughrue Mion, PLLC

(57) ABSTRACT

There is provided an electrolytic solution which has excellent flame retardance, low temperature characteristics and withstand voltage, high solubility of an electrolyte salt and excellent compatibility with hydrocarbon solvents, and comprises a chain carbonate (I) and an electrolyte salt (II), and the chain carbonate (I) is represented by the formula (I):

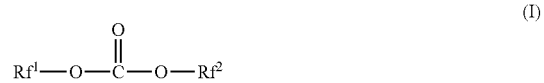

(I)

wherein $Rf^1$ is a fluorine-containing alkyl group having a fluorine content of 10 to 76% by mass and having, at its end, a moiety represented by the formula (Ia):

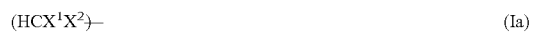

(Ia)

wherein $X^1$ and $X^2$ are the same or different and each is H or F; $Rf^2$ is a fluorine-containing alkyl group having a fluorine content of 10 to 76% by mass and having, at its end, $-CF_3$ or the moiety represented by the above-mentioned formula (Ia).

6 Claims, No Drawings

ELECTROLYTIC SOLUTION

TECHNICAL FIELD

The present invention relates to an electrolytic solution comprising a chain carbonate containing at least one fluorine-containing alkyl group having hydrogen atom at its end and an electrolyte salt.

BACKGROUND ART

Carbonates such as ethylene carbonate, propylene carbonate and dimethyl carbonate are used as a solvent for an electrolyte salt of lithium secondary battery, solar cell, radical battery and capacitor. However since a flash point is low and combustibility is high, there is a danger of firing and explosion attributable to over-charging and over-heating, and in addition, since viscosity is high and conductivity at low temperatures is low, there is a problem that an output is decreased.

In addition, in lithium batteries, increase of a withstand voltage of an electrolytic solution is demanded for increasing a capacity. Further in capacitors, it is desirable that both of a negative electrode and a positive electrode are made of hard carbon, particularly it is desirable that a capacitor can be used stably at a voltage of not less than 3 V. In the case of solvents for electrolyte salts such as propylene carbonate and dimethyl carbonate which are conventionally used, decomposition of an electrolytic solution occurs at a voltage of not less than 3 V, and therefore such solvents cannot be used.

To solve the mentioned problem, methods of adding a fluorine-containing ether compound have been proposed (JP6-176768A, JP8-37024A, JP11-307123A, JP2000-294281A, etc.).

However fluorine-containing ether compounds have disadvantages that solubility of a lithium salt which is an electrolyte salt is low, and since compatibility of the compounds with hydrocarbon carbonates which are used as a solvent for dissolving an electrolyte salt is low, separation into two phases occurs.

On the other hand, use of a fluorine-containing chain carbonate which is obtained by fluorinating a chain carbonate is proposed. For example, there are proposed a carbonate having a fluorine-containing alkyl group at one end and a hydrocarbon alkyl group at another end (JP6-219992A), carbonates in which an end of a fluorine-containing alkyl group is perfluoro, such as a dicarbonate having ethylene in the midst thereof and $CF_3(CF_2)(CH_2)$— at both ends thereof (JP10-149840A) and a carbonate having hexafluoroisopropyl groups at both ends thereof (JP2001-256983A), and in addition, a carbonate having a fluorine-containing ether group at one end and a hydrocarbon alkyl group at another end (JP2000-327634A).

However the carbonates in which an end of fluorine-containing alkyl group is a perfluoro group (JP10-149840A and JP2001-256983A) have disadvantages that solubility of an electrolyte salt is low and compatibility with a hydrocarbon solvent is poor. In the case of carbonates having a hydrocarbon alkyl group at one end (JP6-219992A and JP2000-327634A), solubility of an electrolyte salt and compatibility with a hydrocarbon solvent are improved, but lowering of flame retardance and withstand voltage due to decrease in a fluorine content is found.

In the case of electrolytic solutions for capacitors and radical batteries which repeat charging and discharging similarly to lithium secondary batteries, there are desired enhancement of flame retardance and withstand voltage and enhancement of low temperature characteristics in which viscosity is not high even at low temperatures and yet decrease in conductivity is small.

DISCLOSURE OF INVENTION

An object of the present invention is to solve the above-mentioned problems involved in conventional technologies and provide an electrolytic solution which is excellent in flame retardance, low temperature characteristics and withstand voltage, is high in solubility of an electrolyte salt and is also excellent in compatibility with a hydrocarbon solvent.

The present inventors have found that disadvantages of a chain carbonate having fluorine-containing alkyl groups such as lowering of solubility of an electrolyte salt and lowering of compatibility with a hydrocarbon solvent can be eliminated by containing hydrogen atom at an end of at least one fluorine-containing alkyl group while maintaining effects derived from the fluorine-containing alkyl groups of the chain carbonate such as excellent flame retardance, low temperature characteristics and withstand voltage, and have completed the present invention.

Namely, the present invention relates to an electrolytic solution comprising a chain carbonate (I) and an electrolyte salt (II) and the chain carbonate (I) is represented by the formula (I):

(I)

wherein $Rf^1$ is a fluorine-containing alkyl group having a fluorine content of 10 to 76% by mass and having, at its end, a moiety represented by the formula (Ia):

(Ia)

where $X^1$ and $X^2$ are the same or different and each is H or F; $Rf^2$ is a fluorine-containing alkyl group having a fluorine content of 10 to 76% by mass and having, at its end, the moiety represented by the above-mentioned formula (Ia) or —$CF^3$.

BEST MODE FOR CARRYING OUT THE INVENTION

The electrolytic solution of the present invention comprises the chain carbonate (I) which is a solvent for dissolving an electrolyte salt and has specific fluorine-containing alkyl groups and the electrolyte salt (II).

The chain carbonate (I) used in the present invention is represented by the formula (I):

(I)

wherein $Rf^1$ is a fluorine-containing alkyl group having a fluorine content of 10 to 76% by mass and having, at its end, a moiety represented by the formula (Ia):

(Ia)

where $X^1$ and $X^2$ are the same or different and each is H or F (hereinafter in some cases, this fluorine-containing alkyl group is referred to as "ωH-fluoroalkyl group" since it has hydrogen atom at its end), preferably a ωH-fluoroalkyl group having 1 to 16 carbon atoms; $Rf^2$ is a fluorine-containing alkyl group having a fluorine content of 10 to 76% by mass and having, at its end, —$CF_3$ or the moiety represented by the above-mentioned formula (Ia), preferably a fluorine-containing alkyl group having 1 to 16 carbon atoms.

Namely, the chain carbonate (I) has fluorine-containing alkyl groups at both ends thereof, and at least one of the fluorine-containing alkyl groups is a ωH-fluoroalkyl group. $Rf^1$ differs from $Rf^2$ in the point that $Rf^1$ is a ωH-fluoroalkyl group having hydrogen atom at its end while the end of $Rf^2$ may be the moiety represented by the formula (Ia) or —$CF_3$.

The moiety represented by the formula (Ia):

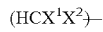

is concretely $CH_3$—, $HCF_2$— or $H_2CF$—. The chain carbonate of the present invention has the mentioned moiety at least at one end thereof, and therefore enhancement of solubility of an electrolyte salt and compatibility with a hydrocarbon solvent can be expected.

It is preferable that the number of carbon atoms of each of $Rf^1$ and $Rf^2$ is 1 to 16. When the number of carbon atoms exceeds 16, since viscosity of the chain carbonate (I) becomes high and a fluorine content thereof is increased, there is a case where solubility of an electrolyte salt and compatibility with other solvent are lowered due to decrease of a dielectric constant. From this point of view, the number of carbon atoms of $Rf^1$ and $Rf^2$ is preferably 1 to 10, more preferably 1 to 7.

In addition, the fluorine content (% by mass) of each of $Rf^1$ and $Rf^2$ is 10 to 76%. When the fluorine content is smaller, effects of improving viscosity at low temperatures and increasing a flash point cannot be obtained sufficiently. From this point of view, the fluorine content (% by mass) of $Rf^1$ and $Rf^2$ is preferably not less than 20%, more preferably not less than 30%.

The fluorine contents of $Rf^1$ and $Rf^2$ are within the range mentioned above and $Rf^1$ and $Rf^2$ may be optionally constituted so as to be a group comprising, for example, a linear or branched alkylene group to which the moiety of the formula (Ia) or —$CF_3$ is bonded. Examples of a minimum structural unit constituting such a linear or branched alkylene group are as follows.

(i) Minimum structural unit of linear type
—$CH_2$—, —CHF—, —$CF_2$—, —CHCl—, —CFCl—, —$CCl_2$—

(ii) Minimum structural unit of branched type

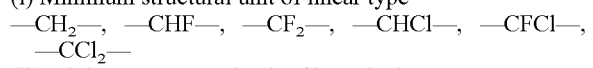

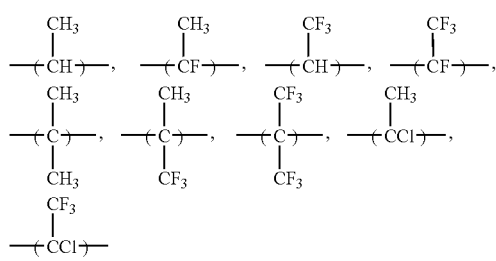

The alkylene group has any one of these minimum structural units alone or a combination of linear types (i) or branch types (ii) or an optional combination thereof. Preferable examples are explained infra.

It is preferable that the alkylene group has a minimum structural unit having no Cl among the above-exemplified examples, because a de-HCl reaction by a base does not occur and thus the structural unit is stable.

Specifically preferable —$Rf^1$ are $HCF_2$—, $H_2CF$—, $CH_3CF$—, $CH_2$—, $HCF_2CH_2CH_2$—, $CH_3CHFCH_2$—, $H_2CFCH_2CH_2$—, $HCF_2CHFCH_2$—, $H_2CFCF_2CH_2$—, $HCFClCF_2CH_2$—, $HCF_2CFClCH_2$—, $CH_3CHFCH_2CHFCH_2$—, $CH_3CF_2CH_2CF_2CH_2$—, $HCF_2CH_2CF_2CH_2CH_2$—, $HCF_2CHFCF_2CHFCH_2$—, $H_2CFCF_2CFHCF_2CH_2$—, $H_2CFCF_2CHFCF_2CH_2$—, $H_2CFCH_2CHFCH_2CH_2$—, $HCF_2CFClCF_2CFClCH_2$—, $HCFClCF_2CFClCF_2CH_2$—,

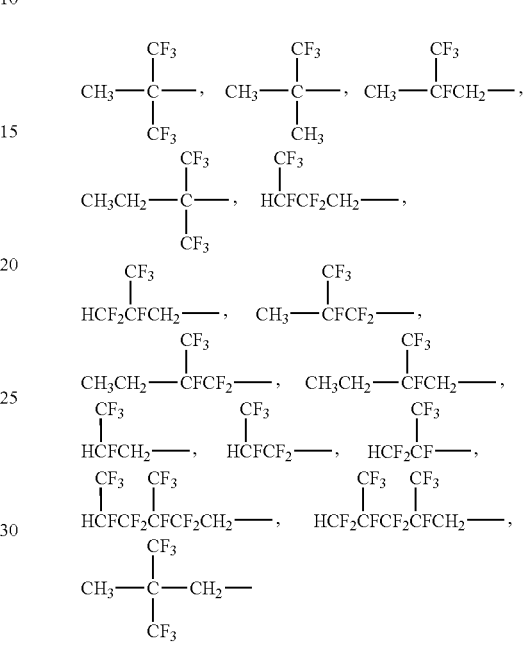

and the like. When —$Rf^1$ has a branch of —$CH_3$ or —$CF_3$, the viscosity thereof easily becomes high, and therefore the number of such branches is preferably small (one) or zero.

Further preferable —$Rf^1$ is a ωH-fluoroalkyl group represented by:

$$(HCX^1X^2)\text{-}(CF_2)_n\text{-}(CH_2)_m \qquad \text{(Ia-1)}$$

wherein $X^1$ and $X^2$ are the same or different and each is H or F; n is 0 or an integer of 1 to 10; m is 0 or an integer of 1 to 5; when $X^1$ and $X^2$ are H, n is not 0.

Examples of the ωH-fluoroalkyl group represented by the formula (Ia-1) are:
$HCF_2\text{-}(CF_2)\text{-}(CH_2)_m$
$HCHF\text{-}(CF_2)_n\text{-}(CH_2)_m$ and
$HCH_2\text{-}(CF_2)_n\text{-}(CH_2)_m$
and particularly when n is 0 or an integer of 1 to 4, a dielectric constant is high, solubility of an electrolyte salt is enhanced and compatibility with other solvent is excellent. When m is 0 or an integer of 1 to 2, effects of improving flame retardance and increasing a withstand voltage are satisfactory and viscosity is low (excellent low temperature characteristics).

The total of n and m is not less than 0 and not more than 15, preferably not more than 6. When it exceeds 15, an effect of enhancing solubility of an electrolyte salt and compatibility with other solvent are lowered.

Specific examples thereof are:
$HCF_2\text{-}(CF_2)_n$,
$HCF_2\text{-}(CF_2)_nCH_2$—,
$HCF_2\text{-}(CF_2)_nCH_2CH_2$—,
$HCHF\text{-}(CF_2)_n$,
$HCHF\text{-}(CF_2)_nCH_2$—,
$HCHF\text{-}(CF_2)_nCH_2CH_2$—, where n is 0 or an integer of 1 to 10, preferably 0 or an integer of 1 to 4, particularly preferably 0 or an integer of 1 to 2,
$HCH_2\text{—}(CF_2)_n\text{—}$,
$HCH_2\text{—}(CF_2)_n\text{—}CH_2\text{—}$ and
$HCH_2\text{—}(CF_2)_n\text{—}CH_2CH_2\text{—}$
where n is an integer of 1 to 10, preferably an integer of 1 to 4, particularly preferably 1 or 2.

Examples of $Rf^2$ are those ωH-fluoroalkyl groups of $Rf^1$ and in addition, the above examples of $Rf^1$ in which the ends thereof such as $CH_3$—, $HCF_2$— or $H_2CF$— is changed to $CF_3$—, for example, $CF_3$—, $CF_3CH_2$—, $CF_3CF_2$—, $CF_3CH_2CH_2$—, $CF_3CF_2CH_2$—, $CF_3CF_2CF_2$—, $CF_3CH(CF_3)$—, $CF_3CF_2CH_2CH_2$—, $CF_3CF_2CF_2CH_2$—, $(CF_3)_3C$—, $CF_3CH(CF_3)CH_2$— and $CF_3CF_2CF_2CH_2CH_2$—.

The chain carbonate (I) having a ωH-fluoroalkyl group at least at one end thereof is made up by combination of these fluorine-containing alkyl groups $Rf^1$ and $Rf^2$. In the combination of $Rf^1$ and $Rf^2$, the end of $Rf^2$ is $CF_3$— or ωH of the formula (Ia) and may be either of them. It is preferable that the both are ωH-fluoroalkyl groups having the end of the formula (Ia). In addition, when both of $Rf^1$ and $Rf^2$ are ωH-fluoroalkyl groups, those ωH-fluoroalkyl groups may be the same or different.

When both of $Rf^1$ and $Rf^2$ are ωH-fluoroalkyl groups, solubility of an electrolyte salt and compatibility with an organic solvent are enhanced due to an effect of improving a dielectric constant by the ωH end, but on the contrary, in some cases, viscosity is increased. On the other hand, when the end of $Rf^2$ is $CF_3$, an effect of lowering viscosity is exhibited.

The chain carbonate (I) having, at least at one end thereof, the ωH-fluoroalkyl group and represented by the formula (I) is a novel compound which has not been disclosed in any prior publications.

Then preferable examples of the fluorine-containing chain carbonate having a ωH-fluoroalkyl group are raised below but the arbonate is not limited to them.

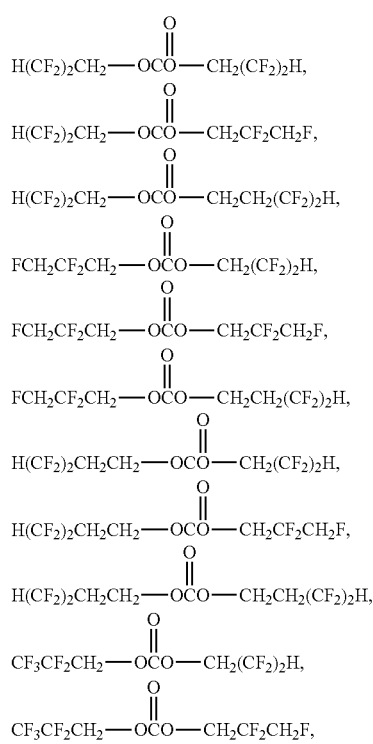

$CF_3CF_2CH_2$—OCO—$CH_2CH_2(CF_2)_2H$, $CF_3CH_2CH_2$—OCO—$CH_2(CF_2)_2H$, $CF_3CH_2CH_2$—OCO—$CH_2CF_2CH_2F$, $CF_3CH_2CH_2$—OCO—$CH_2CH_2(CF_2)_2H$, $CF_3CF(CF_3)CH_2CH_2$—OCO—$CH_2(CF_2)_2H$, $CF_3CF(CF_3)CH_2CH_2$—OCO—$CH_2CF_2CH_2F$, $CF_3CF(CF_3)CH_2CH_2$—OCO—$CH_2CH_2(CF_2)_2H$.

Examples of a synthesizing method are methods of subjecting one or two kinds of fluoro alcohols represented by the formula (Ib):

$Rf^1$—OH or $Rf^2$—OH wherein $Rf^1$ and $Rf^2$ are as defined above, to the following reactions.
(1) Fluoro alcohol is reacted with phosgene such as $COCl_2$, $COF_2$ or triphosgene under basic condition.
(2) Fluoro alcohol is reacted with a compound represented by the formula (Ic):

(Ic)
$$R^1\text{—O—}\overset{\overset{\displaystyle O}{\|}}{C}\text{—O—}R^2$$

wherein $R^1$ and $R^2$ are the same or different and each is an alkyl group, preferably methyl or ethyl, in the presence of a basic catalyst or an acid catalyst, and the reaction is continued while distilling off an alcohol (methanol and ethanol) generated as a byproduct.
(3) Fluoro alcohol is reacted with a compound represented by the formula (Id):

(Id)
$$R^3\text{—O—}\overset{\overset{\displaystyle O}{\|}}{C}\text{—O—}R^4$$

wherein $R^3$ and $R^4$ are the same or different and each is an aryl group, preferably phenyl, in the presence of a basic catalyst or an acid catalyst.
(4) Fluoro alcohol is reacted with a compound represented by the formula (Ie):

(Ie)
$$Cl\text{—}\overset{\overset{\displaystyle O}{\|}}{C}\text{—O—}R^5$$

wherein $R^5$ is an alkyl group, preferably methyl or ethyl, under basic condition, and the reaction is continued while distilling off an alcohol (methanol and ethanol) generated as a byproduct.

(5) Synthesis is carried out by two steps in such a manner that after reacting $Rf^1$—OH or $Rf^2$—OH in the presence of an equivalent amount of or an excessive amount of phosgene or trichlorophosgene to obtain

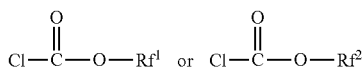

different kinds of fluorine-containing alcohols are reacted to each of the obtained products, respectively.

When $Rf^1$ and $Rf^2$ are different kinds of ωH-fluoroalkyl groups, the chain carbonate may be synthesized by two steps using the above-mentioned methods (3) and (4).

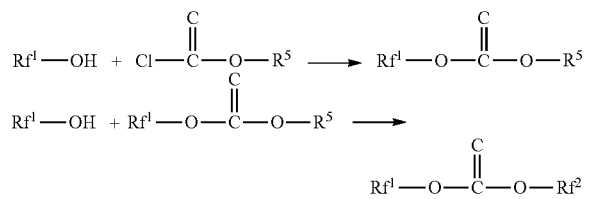

In addition, when $Rf^1$ and $Rf^2$ are different kinds of ωH-fluoroalkyl groups, the method (3) may be employed.

Further the chain carbonate in which $Rf^2$ is a fluorine-containing alkyl group having $CF_3$— at its end can be synthesized by the same reaction as above, and it is particularly desirable to synthesize by the method (3), (4) or (5).

In the present invention, one kind of other solvent (III) for dissolving an electrolyte salt or two or more kinds thereof may be mixed in addition to the chain carbonate (I) having a ωH-fluoroalkyl group.

The other solvents (III) for dissolving an electrolyte salt may be non-fluorine-containing solvents such as hydrocarbon carbonate solvents, nitrile-based solvents, lactone-based solvents and ester-based solvents, and fluorine-containing solvents other than the fluorine-containing chain carbonate (I).

Examples of the non-fluorine-containing solvents are, for instance, ethylene carbonate, propylene carbonate, butylene carbonate, γ-butyrolactone, 1,2-dimethoxyethane, tetrahydrofuran, 2-methyltetrahydrofuran, 1,3-dioxolan, 4-methyl-1,3-dioxolan, methyl formate, methyl acetate, methyl propionate, dimethyl carbonate, ethyl methyl carbonate, diethyl carbonate, acetonitrile, dimethyl sulfoxide, methylpyrrolidone and the like. Particularly from the viewpoint of improvement of a dielectric constant, oxidation resistance and electrochemical stability, ethylene carbonate, propylene carbonate, diethyl carbonate, γ-butyrolactone, 1,2-dimethoxyethane, 1,3-dioxolan and acetonitrile are preferable.

In addition, preferable as the fluorine-containing solvent other than the fluorine-containing chain carbonate (I) are, for example, fluorine-containing carbonates described in JP6-219992A to JP2000-327634A, particularly fluorine-containing carbonates described in JP6-219992A and JP2001-256983A and fluorine-containing ethers described in JP6-176768A to JP2000-294281A.

Also particularly in application on capacitors requiring a high withstand voltage, it is desirable to use a fluorine-containing cyclic carbonate as the other solvent (III) for dissolving an electrolyte salt. Further preferable are cyclic carbonates represented by the formula (3):

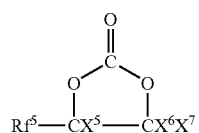

wherein $Rf^5$ has a fluorine content of 10 to 76% by mass and is a fluorine-containing ether group, a fluorine-containing alkoxy group or a fluorine-containing alkyl group having not less than two carbon atoms; $X^5$ and $X^6$ are the same or different and each is H, F, Cl, $CF_3$ or $CH_3$; $X^7$ is H, F, Cl or an alkyl group in which hydrogen atoms may be substituted with halogen atoms or hetero atoms may be contained in its chain.

Particularly preferable examples of usable cyclic carbonate are, for instance, fluorine-containing cyclic carbonates in which in the formula (3), $X^5$, $X^6$ and $X^7$ are H, and $Rf^5$ is $CF_3$—, $CF_3CF_2CH_2$—, $HCF_2CF_2CH_2$—, $CF_3CF(CF_3)CH_2$—, $CF_3CH(CF_3)CH_2$—, $CF_3CF_2CF_2CH_2$—, $CF_3CH_2OCH_2$—, $H(CF_2)_2CH_2OCH_2$—, $CF_3OCH_2$—, $CF_3CF_2CH_2OCH_2$— or $FCH_2CF_2CH_2OCH_2$—.

On the other hand, fluorine-containing ethers are excellent in an effect of enhancing non-combustibility and are useful, but are low in compatibility with non-fluorine-containing solvent for dissolving an electrolyte salt, particularly hydrocarbon carbonates such as ethylene carbonate and diethylene carbonate, and when a fluorine-containing ether is mixed in a specified amount or more in a non-fluorine-containing solvent for dissolving an electrolyte salt, in some cases, there arises separation into two layers. However, when the fluorine-containing chain carbonate (I) is present, a homogeneous solution comprising those three components can be formed easily. In this regard, it is presumed that the fluorine-containing chain carbonate (I) functions as a compatibilizing agent for making the fluorine-containing ether compatible with the non-fluorine-containing solvent for dissolving an electrolyte salt. Therefore further enhancement of non-combustibility can be expected in the case of an electrolytic solution comprising the fluorine-containing chain carbonate (I), the electrolyte (II), the non-fluorine-containing solvent for dissolving an electrolyte salt and the fluorine-containing ether.

It is preferable that the amount of other solvent (III) for dissolving an electrolyte salt is not less than 1% by mass, preferably not less than 10% by mass, particularly not less than 20% by mass in the whole solvents for dissolving an electrolyte salt, from the point that solubility of the electrolyte salt is satisfactory. An upper limit thereof is 98% by mass, preferably 90% by mass, particularly 80% by mass from the viewpoint of flame retardance, low temperature characteristics and withstand voltage.

Particularly in the case of capacitors, in order to cope with a high current density, a larger concentration of the electrolyte salt in the electrolytic solution is desirable. From this point of view, it is preferable to use hydrocarbon solvents being excellent in solubility of the electrolyte salt, particularly fluorine-containing carbonates other than the above-mentioned fluorine-containing chain carbonate of the present invention, propylene carbonate, γ-butyrolactone, acetonitrile, 1,3-dioxolane and the like together.

Further in the case of capacitors, when a high applying voltage is used, since the fluorine-containing chain carbonate of the present invention has a high voltage for oxidation resistance, it is preferable to use the carbonate in combination with the other solvent and an electrolyte salt which are high in a voltage for oxidation resistance. From this point of view, preferable as the other solvent are fluorine-containing carbonates other than the above-mentioned fluorine-containing chain carbonate of the present invention, particularly fluorine-containing cyclic carbonates, propylene carbonate, γ-butyrolactone and sulfolane, and preferable as the electrolyte salt are salts having an anion of $BF_4^-$, $PF_6^-$, $ASF_6^-$ or $SbF_6^-$ out of salts explained infra.

Then the electrolyte salt (II) which is another component of the electrolytic solution of the present invention is explained.

Examples of the electrolyte salt (II) usable in the present invention are known metallic salts, liquid salts (ionic liquids), inorganic polymer salts, organic polymer salts and the like.

Of these electrolyte salts, there are particularly suitable compounds depending on purposes of the electrolytic solution. Next, examples of suitable electrolyte salts classified by applications are raised below, but the electrolyte salt is not limited to them. The electrolyte salts exemplified below can be optionally used for other applications.

Firstly, various organic metallic salts of boron anion type, oxygen anion type, nitrogen anion type, carbon anion type, phosphorus anion type or the like can be used as a metallic salt for lithium secondary battery, and it is preferable to use metallic salts of oxygen anion type and nitrogen anion type.

Specifically $CF_3SO_3Li$, $C_4F_9SO_3Li$, $C_8F_{17}SO_3Li$, $CH_3SO_3Li$, $C_6H_5SO_3Li$, $LiSO_3C_2F_4SO_3Li$, $CF_3CO_2Li$, $C_6H_5CO_2Li$, $Li_2C_4O_4$ and the like are used as the metallic salt of oxygen anion type, and it is particularly preferable to use $CF_3SO_3Li$, $C_4F_9SO_3Li$ and $C_8F_{17}SO_3Li$.

Examples of the metallic salt of nitrogen anion type are $(CF_3SO_2)_2NLi$ (TFSI), $(C_2F_5SO_2)_2NLi$ (BETI), $(CF_3SO_2)(C_4F_9SO_2)NLi$, $(CF_3SO_2)(C_8F_{17}SO_2)NLi$, $(CF_3CO)_2NLi$, $(CF_3CO)(CF_3CO_2)NLi$, $((CF_3)_2CHOSO_2)_2NLi$, $(C_2F_5CH_2O\ SO_2)_2NLi$ and the like, and it is particularly preferable to use $(CF_3SO_2)_2NLi$ (TFSI) and $(C_2F_5SO_2)_2NLi$ (BETI).

Examples of an inorganic metallic salt which can be used are $LiPF_6$, $LiBF_4$, $LiAsF_6$, $LiClO_4$ and the like, and it is particularly preferable to use $LiPF_6$ and $LiBF_4$.

Examples of an organic metallic salt for capacitors are tetraalkyl quaternary ammonium salts represented by $(Me)_x(Et)_yN$, where Me represents methylene; Et represents ethylene; x and y are the same or different and each is 0 or an integer of 1 to 4 and x+y=4. Specifically there are $Et_4NBF_4$, $Et_4NClO_4$, $Et_4NPF_6$, $Et_4NAsF_6$, $Et_4NSbF_6$, $Et_4NCF_3SO_3$, $Et_4N(CF_3SO_2)_2N$, $Et_4NC_4F_9SO_3$, $Et_3MeBF_4$, $Et_3MeClO_4$, $Et_3MePF_6$, $Et_3MeAsF_6$, $Et_3MeSbF_6$, $Et_3MeCF_3SO_3$, $Et_3Me(CF_3SO_2)_2N$ and $Et_3MeC_4F_9SO_3$, and it is particularly preferable to use $Et_4NBF_4$, $Et_4NPF_6$, $Et_4NSbF_6$ and $Et_4NAsF_6$. In addition, of these tetraalkyl quaternary ammonium salts, it is desirable to use quaternary ammonium salts in which one or two of alkyl groups are ethers, from the viewpoint of decrease in viscosity. For example, N,N-diethyl-N-methyl-N-(2-methoxyethyl)ammonium salt or the like is preferable since viscosity is low. Also a spirobipyrrolidinium salt is preferable since its viscosity is low and particularly low temperature characteristics are excellent. Preferable anion species of salts are $BF_4^-$, $PF_6^-$, $ASF_6^-$ and $SbF_6^-$ which are excellent in oxidation resistance.

Examples of an inorganic metallic salt which can be used are $LiPF_6$, $LiBF_4$, $LiAsF_6$, $LiSbF_6$, $LiClO_4$, $NaPF_6$, $NaBF_4$, $NaAsF_6$, $NaClO_4$, $KPF_6$, $KBF_4$, $KAsF_6$, $KClO_4$ and the like, and it is particularly preferable to use $LiPF_6$, $LiBF_4$, $LiSbF_6$, $LiAsF_6$, $NaPF_6$ and $NaBF_4$.

Examples of electrolyte salt for dye-sensitized solar cell are $R^6R^7R^8R^9NI$, where $R^6$ to $R^9$ are the same or different and each is an alkyl group having 1 to 3 carbon atoms, LiI, NaI, KI,

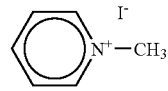

and the like.

When a liquid salt is used as the electrolyte salt (II), there are salts of an organic or inorganic anion with polyalkylimidazolium cation, N-alkylpyridinium cation, tetraalkylammonium cation, tetraalkylammonium cation having an ether chain, tetraalkylphosphonium cation or spirobipyrrolidinium cation for lithium secondary batteries, capacitors and dye-sensitized solar cells. Particularly preferable are 1,3-dialkylimidazolium salt, spirobipyrrolidinium salt and alkylammonium salt having an ether chain.

Examples of preferable polyalkylimidazolium cation are 1,3-dialkylimidazolium cations such as 1-ethyl-3-methylimidazolium cation ($EMI^+$) and 1-butyl-3-methylimidazolium cation ($BMI^+$); trialkylimidazolium cations such as 1,2-dimethyl-3-propylimidazolium cation ($DMPI^+$); and the like.

Examples of preferable inorganic anion are, for instance, $AlCl_4^-$, $BF_4^-$, $PF_6^-$, $ASF_6^-$, $I^-$ and the like, and examples of the organic anion are, for instance, $CH_3COO^-$, $CF_3COO^-$, $C_3F_7COO^-$, $CF_3SO_3^-$, $C_4F_9SO_3^-$, $(CF_3SO_2)_2N^-$, $(C_2F_5SO_2)_2N^-$ and the like.

Specifically there are $EMIAlCl_4$, $EMIBF_4$, $EMIPF_6$, $EMIAsF_6$, EMII, $EMICH_3COO$, $EMICF_3COO$, $EMIC_3F_7COO$, $EMICF_3SO_3$, $EMIC_4F_9SO_3$, $EMI(CF_3SO_2)_2N$, $EMI(C_2F_5SO_2)_2N$, $BMIAlCl_4$, $BMIBF_4$, $BMIPF_6$, $BMIAsF_6$, BMII, $BMICH_3COO$, $BMICF_3COO$, $BMIC_3F_7COO$, $BMICF_3SO_3$, $BMIC_4F_9SO_3$, $BMI(CF_3SO_2)_2N$, $BMI(C_2F_5SO_2)_2N$, $DMPIAlCl_4$, $DMPIBF_4$, $DMPIPF_6$, $DMPIAsF_6$, DMPII, $DMPICH_3COO$, $DMPICF_3COO$, $DMPIC_3F_7COO$, $DMPICF_3SO_3$, $DMPIC_4F_9SO_3$, $DMPI(CF_3SO_2)_2N$, $DMPI(C_2F_5SO_2)_2N$ and the like.

Particularly for dye-sensitized solar cells, iodides such as EMII, BMII and DMPII are suitable.

The amount of electrolyte salt (II) varies depending on a required current density, application, kind of an electrolyte salt, etc., and it is preferable that the blending amount is not less than 0.1 part by mass, further not less than 1 part by mass, especially not less than 5 parts by mass, and not more than 200 parts by mass, further not more than 100 parts by mass, especially not more than 50 parts by mass based on 100 parts by mass of the chain carbonate (I) having a fluorine-containing alkyl group terminated with ωH.

The electrolytic solution of the present invention is prepared by dissolving the electrolyte salt (II) in the chain carbonate (I) having a fluorine-containing alkyl group terminated with ωH or in a solvent comprising the carbonate (I) and the solvent (III) for dissolving the electrolyte salt.

In addition, the electrolytic solution of the present invention may be in the form of gel (plasticized) prepared in combination of a polymer material which dissolves or swells in the solvent used for the electrolytic solution of the present invention.

Examples of the polymer material are known polyethylene oxide, polypropylene oxide and modified compounds thereof (JP8-222270A and JP2002-100405A); fluorine-containing resins such as polyacrylate polymers, polyacrylonitrile, polyvinylidene fluoride and a vinylidene fluoride-hexafluoropropylene copolymer (JP4-506726A, JP8-507407A and JP10-294131A); complexes of those resins with hydrocarbon resins (JP11-35765A and JP11-86630A); and the like. It is particularly desirable to use polyvinylidene fluoride and a vinylidene fluoride-hexafluoropropylene copolymer.

In addition, an ion-conducting compound described in JP2004-301934A can be used.

This ion-conducting compound is a non-crystalline fluorine-containing polyether compound having a fluorine-containing group in its side chain and represented by the formula (1):

wherein D is represented by the formula (2):

where D1 is an ether unit having a fluorine-containing ether group in its side chain and represented by the formula (2a):

where Rf is a fluorine-containing ether group which may have a crosslinkable functional group; $R^{10}$ is a group or bond bonding Rf to a trunk chain;

FAE is an ether unit having a fluorine-containing alkyl group in its side chain and represented by the formula (2b):

where Rfa is hydrogen atom or a fluorine-containing alkyl group which may have a crosslinkable functional group; $R^{11}$ is a group or bond bonding Rfa to the trunk chain;

AE is an ether unit represented by the formula (2c):

where $R^{13}$ is hydrogen atom, an alkyl group which may have a crosslinkable functional group, an aliphatic cyclic hydrocarbon group which may have a crosslinkable functional group or an aromatic hydrocarbon group which may have a crosslinkable functional group; $R^{12}$ is a group or bond bonding $R^{13}$ to the trunk chain;

Y is a unit having at least one of the formulae (2d-1) to (2d-3):

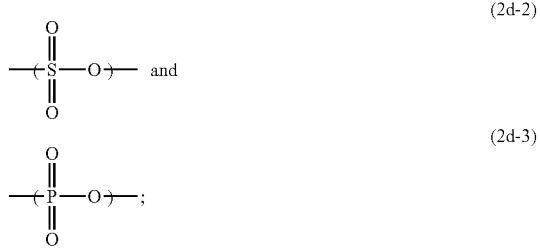

n is 0 or an integer of 1 to 200; m is 0 or an integer of 1 to 200; p is 0 or an integer of 1 to 10,000; q is an integer of 1 to 100; n +m is not 0, and the order of bonding of D1, FAE, AE and Y is not specified; A and B are the same or different and each is hydrogen atom, an alkyl group which may have fluorine atom and/or a crosslinkable functional group, a phenyl group which may have fluorine atom and/or a crosslinkable functional group, a —COOH group, —OR$^{14}$ where R$^{14}$ is hydrogen atom or an alkyl group which may have fluorine atom and/or a crosslinkable functional group, an ester group or a carbonate group (when the end of D is oxygen atom, A and B are not a —COOH group, —OR$^{14}$, an ester group and a carbonate group).

To the electrolytic solution of the present invention may be blended other additives as case demands. Examples of the other additives are, for instance, metallic oxides, glass and the like.

It is preferable that the electrolytic solution of the present invention does not freeze and the electrolyte salt is not precipitated at low temperatures (for example, 0C. or −20° C.). Specifically a viscosity at 0C. of the electrolytic solution is preferably not more than 100 mPa·s, more preferably not more than 30 mPa·s, especially preferably not more than 15 mPa·s. In addition, a viscosity at −20° C. of the electrolytic solution is preferably not more than 100 mPa·s, more preferably not more than 40 mPa·s, especially preferably not more than 15 mPa·s.

The electrolytic solution of the present invention is suitable as an electrolytic solution for electrochemical devices since flame retardance, low temperature characteristics, withstand voltage, solubility of the electrolyte salt and compatibility with a hydrocarbon solvent can be enhanced simultaneously.

Namely, the present invention relates to the electrochemical device provided with the above-mentioned electrolytic solution. Examples of the electrochemical device are lithium secondary batteries, capacitors (electrolytic double layer capacitors), radical batteries, solar cells (particularly dye-sensitized solar cells), fuel cells, various kinds of electrochemical sensors, electrochromic elements, aluminum electrolytic condenser, tantalum electrolytic condenser and the like. Particularly lithium secondary batteries and electrolytic double layer capacitor, especially electrolytic double layer capacitors having a withstand voltage of not less than 3.5 V are suitable. In the case of high capacity electrolytic double layer capacitors, a stable withstand voltage of not less than 3.0 V is required, and the electrolytic double layer capacitor of the present invention fully satisfies such requirements.

In addition, the electrolytic solution of the present invention can be used as an ionic conductor for an antistatic coating material.

EXAMPLES

The present invention is then explained by means of Examples and Comparative Examples, but is not limited to them.

The methods of measurement adopted in the present invention are as follows.

NMR: AC-300 available from BRUKER CO., LTD. is used.

$^{19}$F-NMR:

Measuring conditions: 282 MHz (trichlorofluoromethane =0 ppm)

$^{1}$H-NMR:

Measuring conditions: 300 MHz (tetramethylsilane =0 ppm)

IR:

Measurement is carried out at room temperature with a Fourier-transform infrared spectrophotometer 1760X available from Perkin Elmer Co., Ltd.

Fluorine content (% by mass):

The fluorine content is obtained by burning 10 mg of a sample by an oxygen flask combustion method, absorbing cracked gas in 20 ml of de-ionized water and then measuring a fluorine ion concentration in the fluorine ion-containing solution through a fluoride-ion selective electrode method (using a fluorine ion meter model 901 available from Orion).

Preparation Example 1

A dry ice/acetone reflux tube was mounted on the top of a 200 ml three-necked glass flask equipped with a stirrer, and after sufficiently replacing the inside of the flask with nitrogen, 60.25 g (456 mmol) of fluoro alcohol: $HCF_2CF_2CH_2OH$ and 53.67 g (251 mmol) of diphenyl carbonate were poured into the flask.

Then thereto was added 9.52 g (94 mmol) of $K_2CO_3$, followed by three-hour stirring under refluxing (130° C.). The reaction solution changed its color from non-uniform white to yellow. The obtained reaction solution was brought to room temperature and subjected to quenching with 1N aqueous solution of HCl. Then an aimed product of a lower layer was collected and subjected to washing two times with saturated $Na_2CO_3$, followed by distillation (0.3 mmHg) to obtain a carbonate having ωH-fluoroalkyl groups at both ends thereof as a distillate at 70° C. (yield: 31%).

According to $^{19}$F-NMR and $^{1}$H-NMR analyses, it was confirmed that this carbonate having ωH-fluoroalkyl groups at both ends thereof was a carbonate having fluorine-containing alkyl groups terminated with H at both ends thereof.

$^{19}$F-NMR: (neat): −126.0 ppm (4F), −139.4 to −139.0 ppm (4F)

1H-NMR: (neat): 4.67 to 4.78 ppm (4H), 5.84 to 6.25 ppm (2H)

Additionally a stretching vibration of a carbonyl group was confirmed at 1,751.7 cm$^{-1}$ and 1,805.1 cm$^{-1}$ by measuring with IR.

Preparation Example 2

(Synthesis of ωH-fluoroalkyl Carbonate)

A reflux tube was mounted on the top of a 500 ml three-necked glass flask equipped with a stirrer so that a gas could flow to a washing trap and an alkali trap and the gas passed through the trap could be removed outside the draft. Such a test equipment was assembled, and a reaction was carried out. Then 120.29 g (518 mmol) of fluoro alcohol: $H(CF_2)_4CH_2OH$, 54 g (517 mmol) of triethylamine and 200 ml of THF were poured into a reaction vessel, followed by stirring on an ice bath. Paying attention to heat generation, 17 to 34 g (equivalent amount or more) of $COF_2$ gas was introduced while flowing $N_2$ gas. At an initial stage of the introduction, white smoke was generated, but when equivalent amount or more of $COF_2$ gas was introduced, no white smoke was generated. After thirty-minute stirring, the reaction solution was washed with a 1N aqueous solution of HCl, and an aimed product of a lower layer was collected. Then distillation (0.3 mmHg) was carried out to obtain a carbonate having ωH-fluoroalkyl groups at both ends thereof as a distillate at 120° C. (yield: 93%).

According to $^{19}$F-NMR and $^{1}$H-NMR analyses, it was confirmed that this carbonate having ωH-fluoroalkyl groups at both ends thereof was a carbonate having fluorine-containing alkyl groups terminated with H at both ends thereof.

$^{19}$F-NMR: (neat): −122.33 to −122.14 ppm (4F), −127.09 to −127.03 ppm (4F), −131.80 ppm (4F), −139.59 to −139.39 ppm (4F)

$^{1}$H-NMR: (neat): 4.46 to 4.56 ppm (4H), 5.62 to 6.05 ppm (2H)

Additionally a stretching vibration of a carbonyl group was confirmed at 1,751.7 cm$^{-1}$ and 1,805.1 cm$^{-1}$ by measuring with IR.

Preparation Example 3

(Synthesis of Carbonate Having Fluorine-Containing Alkyl Group Terminated with ωH at One End Thereof)

A dry ice/acetone reflux tube was mounted on the top of a 200 ml three-necked glass flask equipped with a stirrer, and after sufficiently replacing the inside of the flask with nitrogen, 30.13 g (228 mmol) of fluoro alcohol: $HCF_2CF_2CH_2OH$ and 53.67 g (251 mmol) of diphenyl carbonate were poured into the flask.

Then thereto was added 9.52 g (94 mmol) of $K_2CO_3$, followed by three-hour stirring under refluxing (130° C.). The reaction solution changed its color from non-uniform white to yellow. The obtained product was a carbonate represented by the following formula.

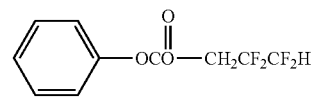

The obtained reaction solution was brought to room temperature and subjected to quenching with 1N aqueous solution of HCl. Then an aimed product of a lower layer was collected and subjected to washing two times with saturated $Na_2CO_3$, followed by distillation (0.3 mmHg) to obtain a carbonate having a ωH-fluoroalkyl group at one end thereof as a distillate at 65° C. (yield: 60%).

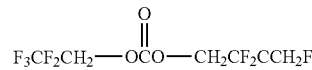

According to $^{19}$F-NMR and $^{1}$H-NMR analyses, it was confirmed that this carbonate having a ωH-fluoroalkyl group at one end thereof was a carbonate having a fluorine-containing alkyl group terminated with H at one end thereof.

$^{19}$F-NMR: (neat): −85.73 ppm (3F), −117.9 to −114.8 ppm (2F), −125.4 to −125.3 ppm (2F), −138.8 to −138.6 ppm (2F)

$^{1}$H-NMR: (neat): 5.35 to 5.45 ppm (4H), 6.49 to 6.93 ppm (H)

Additionally a stretching vibration of a carbonyl group was confirmed at 1,778.32 cm$^{-1}$ by measuring with IR.

Comparative Preparation Example 1

(Synthesis of Carbonate Having $Rf^1$ of $HCF_2CF_2CH_2$— and $Rf^2$ of —$CH_2CH_2CH_3$)

A reflux tube was mounted on the top of a 500 ml three-necked glass flask equipped with a stirrer, and after sufficiently replacing the inside of the flask with nitrogen, 50.1 g (378 mmol) of fluoro alcohol: $HCF_2CF_2CH_2OH$, 46.4 g (459 mmol) of triethylamine and 200 ml of THF were poured into the flask, followed by stirring on an ice bath. Then thereto was added 56.24 g (459 mmol) of propyl chloroformate dropwise with a dropping funnel. A reaction solution became turbid in white as a salt was formed, and heat generation of 7° C. was confirmed. After completion of the addition, stirring was continued for three hours. After the stirring was completed, the reaction solution was subjected to quenching with 1N HCl, and an aimed product of a lower layer was collected and washed with pure water two times.

The obtained product was dried with $MgSO_4$ and subjected to distillation (0.3 mmHg) to obtain a carbonate for comparison as a distillate at 32° C. (yield: 90%).

According to $^{19}$F-NMR and $^{1}$H-NMR analyses, it was confirmed that this carbonate was a carbonate having a ωH-fluoroalkyl group at one end thereof and a non-fluorine-containing alkyl group at another end thereof.

$^{19}$F-NMR: (neat): −126.9 to −126.0 ppm (2F), −139.5 to −139.2 ppm (2F)

$^{1}$H-NMR: (neat): 1.00 to 1.06 ppm (3H), 1.71 to 1.84 ppm (2H), 4.20 to 4.25 ppm (2H), 4.59 to 4.69 ppm (2H), 5.87 to 6.29 ppm (H)

Additionally a stretching vibration of a carbonyl group was confirmed at 1,762.26 $cm^{-1}$ by measuring with IR.

Comparative Preparation Example 2

(Preparation of EC/DEC)

Ethylene carbonate and diethylene carbonate were mixed in a weight ratio of 1:1 to obtain a homogeneous solution mixture.

Examples 1 to 3 and Comparative Examples 1 and 2

A flash point, a viscosity and compatibility with a hydrocarbon solvent were determined with respect to the carbonates having ωH-fluoroalkyl groups obtained in Preparation Examples 1, 2 and 3, respectively, the carbonate having a ωH-fluoroalkyl group and a non-fluorine-containing alkyl group and obtained in Comparative Preparation Example 1 and the mixture of hydrocarbon carbonates obtained in Comparative Preparation Example 2. Further to the above-mentioned solutions was blended $LiN(SO_2C_2F_5)_2$ as an electrolyte salt to be a concentration of 1 mole per liter and thus electrolytic solutions were prepared. With respect to those electrolytic solutions, a withstand voltage and solubility of an electrolyte salt were evaluated. The results are shown in Table 1.

Flash Point:

A flash point of the solution is measured according to JIS K2265 (tag closed type).

Withstand voltage:

The electrolytic solution is put in a 3-electrode type voltage measuring cell (working electrode, counter electrode: platinum (area ratio of counter electrode to working electrode is 5:1), reference electrode: Ag, HS cell available from Hosen Kabushiki Kaisha). Sweeping of electric potential is carried out at 3 mV/sec with a potentiostat, and a range where a decomposition current of not less than 0.1 mA is not flowed is assumed to be a withstand voltage (V).

Viscosity:

A viscosity of the solution is measured under the number of revolutions of 60 rpm at a temperature of 25° C., 0° C. and −20° C. with a Brookfield viscometer (VISCONE CV series available from Misec Corporation) by using a cone having a measuring range from 1 to 500 mPa·s.

Solubility of Electrolyte Salt:

To the solution is added $LiN(SO_2C_2F_5)_2$ and tetraethyl ammonium tetrafluoroborate [$(C_2H_5)_4NBF_4$], respectively at room temperature so that a concentration thereof is 1 mole per liter, followed by stirring sufficiently, and solubility is observed with naked eyes.

○: Dissolved homogeneously.

Δ: Slightly suspended.

X: Insoluble matter precipitated.

Compatibility with Hydrocarbon Solvent:

A hydrocarbon solvent is added to the solution at room temperature until its concentration becomes 50% by volume, followed by sufficiently stirring, and solubility is observed with naked eyes. The hydrocarbon solvents to be used are propylene carbonate (PC) and diethylene carbonate (DEC).

○: Dissolved homogeneously.

x: Separated into two phases.

TABLE 1

|  | Ex. 1 | Ex. 2 | Ex. 3 | Com. Ex. 1 | Com. Ex. 2 |
|---|---|---|---|---|---|
| Carbonate | Prep. Ex. 1 | Prep. Ex. 2 | Prep. Ex. 3 | Com. Prep. Ex. 1 | Com. Prep. Ex. 2 |
| Flash point (° C.) | >80 | >80 | >80 | 35 | 24 |
| Withstand voltage (V) | >10 | >10 | >10 | 5.9 | 5.6 |
| Viscosity (25° C.: mPa · s) | 0.8 | 1.0 | 1.0 | 0.6 | 0.6 |
| Viscosity (0° C.: mPa · s) | 2.2 | 2.4 | 1.8 | 2.4 | Solidified |
| Viscosity (−20° C.: mPa · s) | 5.3 | 5.2 | 3.7 | 5.9 | Solidified |
| Solubility of electrolyte salt | | | | | |
| $LiN(SO_2C_2F_5)_2$ | ○ | ○ | ○ | ○ | ○ |
| $(C_2H_5)_4NBF_4$ | ○ | x | ○ | ○ | ○ |
| Compatibility with hydrocarbon solvent | | | | | |
| PC | ○ | ○ | ○ | ○ | ○ |
| DEC | ○ | ○ | ○ | ○ | ○ |

Examples 4 and 5 and Comparative Example 3

Into a 3 ml sample bottle was poured 1 g of the solvent mixture of ethylene carbonate (EC) and diethylene carbonate (DEC) obtained in Comparative Preparation Example 2, and thereto was added 0.5 g of a fluorine-containing ether ($CF_3CF_2CH_2OCF_2CF_2H$), followed by sufficiently stirring. The solution was separated into two layers.

To this solution separated into two layers was added 1.2 g of the fluorine-containing chain carbonates synthesized in Preparation Example 1, Preparation Example 2 and Comparative Preparation Example 1, respectively, followed by sufficiently stirring and then allowing to stand. Thereafter a state of the solution was observed with naked eyes. The result of evaluation is indicated by ○: when the solution is homogeneous, Δ: when the solution is in a suspended state, and X: when precipitation (separation) arises. The results are shown in Table 2.

TABLE 2

|  | Ex. 4 | Ex. 5 | Com. Ex. 3 |
| --- | --- | --- | --- |
| Non-fluorine-containing solvent | EC/DEC | EC/DEC | EC/DEC |
| Fluorine-containing ether | $CF_3CF_2CH_2OCF_2CF_2H$ | $CF_3CF_2CH_2OCF_2CF_2H$ | $CF_3CF_2CH_2OCF_2CF_2H$ |
| Fluorine-containing carbonate | Prep. Ex. 1 | Prep. Ex. 2 | Com. Prep. Ex. 1 |
| Compatibility | ○ | ○ | x |

Example 6

A coin type lithium secondary battery was produced by the following method.
(Preparation of Positive Electrode)

Carbon black (6% by mass) and polyvinylidene fluoride (brand name KF-1000 available from Kureha Kagaku Kabushiki Kaisha) (9% by mass) were added and mixed to $LiCoO_2$ (85% by mass) and the mixture was formed into a slurry by dispersing with N-methyl-2-pyrrolidone. The obtained mixture in the form of slurry was used as an active material for a positive electrode and coated uniformly on a 20 μm thick aluminum foil which was a current collector for a positive electrode. After drying, the coated aluminum foil was punched into a disc form having a diameter of 12.5 mm to make a positive electrode.
(Preparation of Negative Electrode)

A styrene-butadiene rubber (SBR) dispersed in distilled water was added to 94% by weight of artificial graphite powder (brand name KS-44 available from TIMCAL) to be a solid content of 6% by weight, and then was mixed with a disperser to be formed into a slurry. The mixture in the form of slurry was uniformly coated on a 18 μm thick copper foil which was a current collector for a negative electrode. After drying, the coated copper foil was punched into a disc form having a diameter of 12.5 mm to make a negative electrode.
(Preparation of Coin Type Lithium Secondary Battery)

The above-mentioned positive electrode was put in a stainless steel can which doubled as a current collector for a positive electrode, and then the above-mentioned negative electrode was put thereon with a polyethylene separator impregnated with the electrolytic solution of the present invention being placed between them. This can and a sealing sheet which doubled as a current collector for a negative electrode were sealed by caulking with an insulating gasket being placed between them to make a coin type lithium secondary battery. Electrolytic solution 1 of the present invention: Electrolytic solution of $LiPF_6$ (1M); EC/DEC and carbonate of Preparation Example 1 (1/1/0.2% by mass ratio). Charging and discharging were carried out at 1C. A lowering rate of a capacity after 100 cycles to an initial capacity was 8%.

Electrolytic solution 2 of the present invention: Electrolytic solution of $LiPF_6$ (1M); EC/DEC and carbonate of Preparation Example 1 (1/1/0.1% by mass ratio). Charging and discharging were carried out at 1 C. A lowering rate of a capacity after 100 cycles to the initial capacity was 5%.

Electrolytic solution 3 of the present invention: Electrolytic solution of $LiPF_6$ (1M); EC/DEC and carbonate of Preparation Example 2 (1/1/0.2% by mass ratio). Charging and discharging were carried out at 1 C. A lowering rate of a capacity after 100 cycles to the initial capacity was 10%.

Electrolytic solution 4 of the present invention: Electrolytic solution of $LiPF_6$ (1M); EC/DEC and carbonate of Preparation Example 2 (1/1/0.1% by mass ratio). Charging and discharging were carried out at 1 C. A lowering rate of a capacity after 100 cycles to the initial capacity was 7%.

Example 7

Ethanol was added to a mixture of a phenol resin active carbon activated with steam and having a specific surface area of 2,000 $m^2/g$, polytetrafluoroethylene (PTFE) and carbon black in a mass ratio of 8:1:1, followed by kneading. The resulting kneaded product was molded into a sheet and rolled into a 0.6 mm thick sheet. The obtained sheet was punched into a disc having a diameter of 12 mm to prepare an electrode.

This disk-like electrode was adhered to the inside of a positive electrode side and a negative electrode side of a stainless steel case by using a graphite adhesive, in which the stainless steel case served as a current collector and a housing member of a coin cell. Then this stainless steel case was subjected to heat treatment at 200° C. under reduced pressure to remove water, and the disk-like electrode was impregnated with an electrolytic solution prepared by dissolving TEMA·$BF_4$ as an electrolyte salt in the compound synthesized in Preparation Example 1 to make 1M concentration. Then a separator (thickness: 160 μm, percentage of void: 70%) made of a non-woven fabric of polypropylene fiber was put between the both electrodes and the stainless steel case was sealed by caulking with a gasket which was an insulator. Thus a coin type 2.0 mm thick electrolytic double layer capacitor having a 18.4 mm diameter was produced.

After applying dc voltage (5 V) to this capacitor for 48 hours, charging and discharging were carried out 2,000 times at 1.0 to 5.0 V at a current density of 5 $mA/cm^2$. A capacity before and after the charging and discharging was measured, and a lowering rate of the capacity after the charging and discharging to the initial capacity was determined.

As a result, the initial capacity of 145 F./g decreased to 138 F./g after 2,000 cycles, and a lowering rate was 4.8%.

A coin type electrolytic double layer capacitor was produced in the same manner as above except that the electrolyte salt was changed to DEMA·$BF_4$, and a lowering rate of a capacity was determined. The initial capacity of 152 F./g decreased to 146 F./g after 2,000 cycles, and a lowering rate was 3.9%.

A coin type electrolytic double layer capacitor was produced in the same manner as above except that the electrolyte salt was changed to spiro-(1,1')bipyrrolidinium·BF$_4$, and a lowering rate of a capacity was determined. The initial capacity of 162 F/g decreased to 152 F./g after 2,000 cycles, and a lowering rate was 6.2%.

Example 8

To 0.3 g of the electrolytic solutions used in Examples 6 and 7 and 0.3 g of the electrolytic solution prepared in Comparative Preparation Example 2 was completely dissolved at 120° C. 1 g of polyvinylidene fluoride having a number average molecular weight of 150,000 and containing 6.9% by mole of hexafluoropropene, and the obtained solution was cast on a metallic substrate, followed by sufficiently cooling at room temperature. The formed solid electrolyte film was peeled off from the metallic substrate to obtain a gel electrolyte film (1.3 g). The gel electrolyte films were all solid self-keeping films.

These gel electrolyte films were nipped by a metallic mesh and subjected to combustion test by a flame of a gas burner. As a result, the gel electrolyte film prepared by using the electrolytic solution prepared in Comparative Preparation Example 2 burnt, but the gel electrolyte films prepared by using the electrolytic solutions used in Examples 6 and 7 did not burn.

INDUSTRIAL APPLICABILITY

The present invention can provide an electrolytic solution which can enhance flame retardance, low temperature characteristics, withstand voltage, solubility of an electrolyte salt and compatibility with a hydrocarbon solvent together.

The invention claimed is:

1. An electrolytic solution comprising a chain carbonate (I), an electrolyte salt (II) and a fluorine-containing ether, said chain carbonate (I) being represented by the formula (I):

(I)

wherein Rf$^1$ is a fluorine-containing alkyl group having a fluorine content of 10 to 76 mol % and having, at its end, a moiety represented by the formula (Ia-2):

(Ia-2)

wherein X$^1$ and X$^2$ are the same or different and each is H or F; Rf$^2$ is a fluorine-containing alkyl group having a fluorine content of 10 to 76 mol % and having, at its end, —CF$_3$.

2. The electrolytic solution of claim 1, wherein in said chain carbonate (I), Rf$^1$ and/or R$^2$ are fluorine-containing alkyl groups having a fluorine content of 30 to 76% by mass.

3. The electrolytic solution of claim 1, having a viscosity at 0° C. of not more than 30 mPa·s.

4. The electrolytic solution of claim 1, having a viscosity at −20° C. of not more than 40 mPa·s.

5. An electrochemical device provided with the electrolytic solution of claim 1.

6. An electrolytic double layer capacitor provided with the electrolytic solution of claim 1 and having a withstand voltage of not less than 3.5 V.

* * * * *